United States Patent
Du et al.

(10) Patent No.: US 11,867,867 B2
(45) Date of Patent: Jan. 9, 2024

(54) SMART INSECT MONITORING AND IDENTIFICATION DEVICE

(71) Applicants: ORINNO TECHNOLOGY PTE. LTD., Singapore (SG); NATIONAL ENVIRONMENT AGENCY, Singapore (SG)

(72) Inventors: Yu Du, Singapore (SG); Lu Deng, Singapore (SG)

(73) Assignees: ORINNO TECHNOLOGY PTE. LTD., Singapore (SG); NATIONAL ENVIRONMENT AGENCY, Singapore (SG)

(*) Notice: Subject to any disclaimer, the term of this patent is extended or adjusted under 35 U.S.C. 154(b) by 443 days.

(21) Appl. No.: 17/257,376

(22) PCT Filed: Jul. 3, 2019

(86) PCT No.: PCT/SG2019/050331
§ 371 (c)(1),
(2) Date: Dec. 31, 2020

(87) PCT Pub. No.: WO2020/009662
PCT Pub. Date: Jan. 9, 2020

(65) Prior Publication Data
US 2021/0270996 A1      Sep. 2, 2021

(30) Foreign Application Priority Data

Jul. 3, 2018  (SG) .......................... 10201805751U

(51) Int. Cl.
*G01V 8/20* (2006.01)
*G02B 19/00* (2006.01)

(52) U.S. Cl.
CPC ........... *G01V 8/20* (2013.01); *G02B 19/0009* (2013.01); *G02B 19/0085* (2013.01)

(58) Field of Classification Search
CPC . G01V 8/10; G01V 8/20; G01N 21/64; G02B 19/0009; G02B 19/0085
See application file for complete search history.

(56) References Cited

U.S. PATENT DOCUMENTS 9,410,888 B2 *   8/2016   Jayasooriya ....... G01N 21/6486

FOREIGN PATENT DOCUMENTS

| CN | 108051823 A | 5/2018 |
| DE | 102004015197 A1 | 2/2005 |

(Continued)

OTHER PUBLICATIONS

Potamitis et al., Automated Remote Insect Surveillance at a Global Scale and the Internet of Things. Robotics, Aug. 22, 2017, vol. 6, No. 3, pp. 1-14.
(Continued)

*Primary Examiner* — Kevin K Pyo
(74) *Attorney, Agent, or Firm* — Burns & Levinson LLP; Steven M. Mills

(57) ABSTRACT

This invention relates to an insect detection device comprising a sensing device. The sensing device comprises an optical source configured to emit an optical beam; a first lens group configured to collimate the optical beam to form a beam width of a first predetermined range and a beam height of a second predetermined range; a second lens group configured to collect the optical beam from the first lens group and arranged apart from the first lens group defining a sensing zone; an optical detector configured to receive the beam from the second lens group and translate the beam to electrical signals; and a processing unit configured to switch on the optical source and receive the electrical signals from the optical detector.

15 Claims, 15 Drawing Sheets

(56) References Cited

FOREIGN PATENT DOCUMENTS

| WO | 2012054397 A1 | 4/2012 |
| WO | 2013017860 A1 | 2/2013 |
| WO | 2015126855 A1 | 8/2015 |
| WO | 2015160958 A1 | 10/2015 |

OTHER PUBLICATIONS

International Search Report and Written Opinion for corresponding International Application No. PCT/SG2019/050331, dated Sep. 25, 2019.
Second Written Opinion for corresponding International Application No. PCT/SG2019/050331, dated Jul. 23, 2020.
International Preliminary Report on Patentability for corresponding International Application No. PCT/SG2019/050331, completed on Oct. 2, 2020.

* cited by examiner

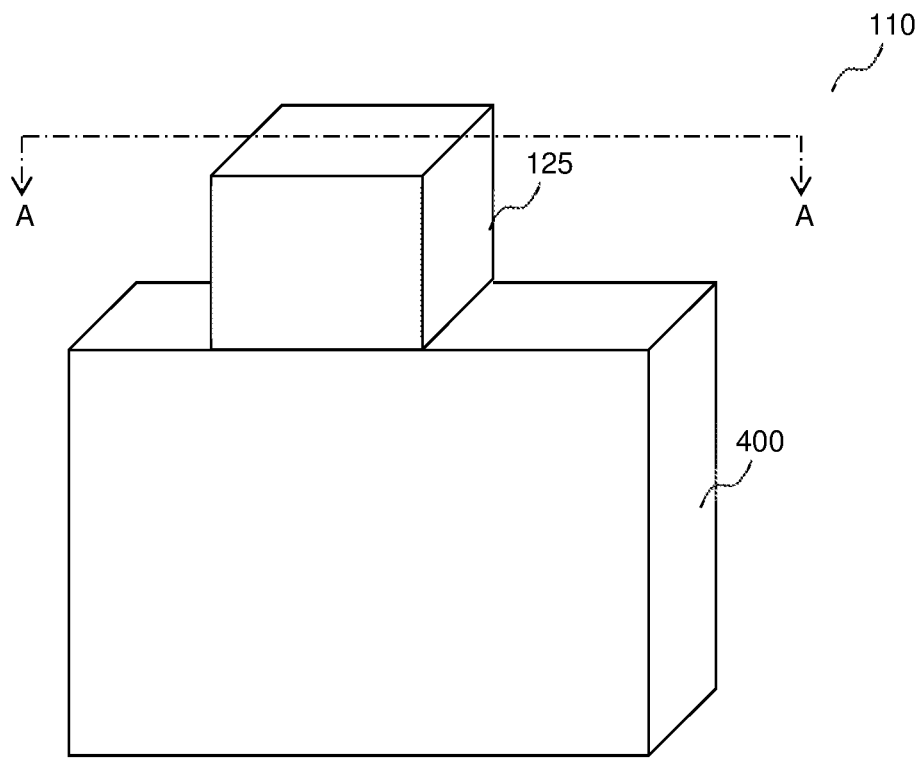
Figure 4.1
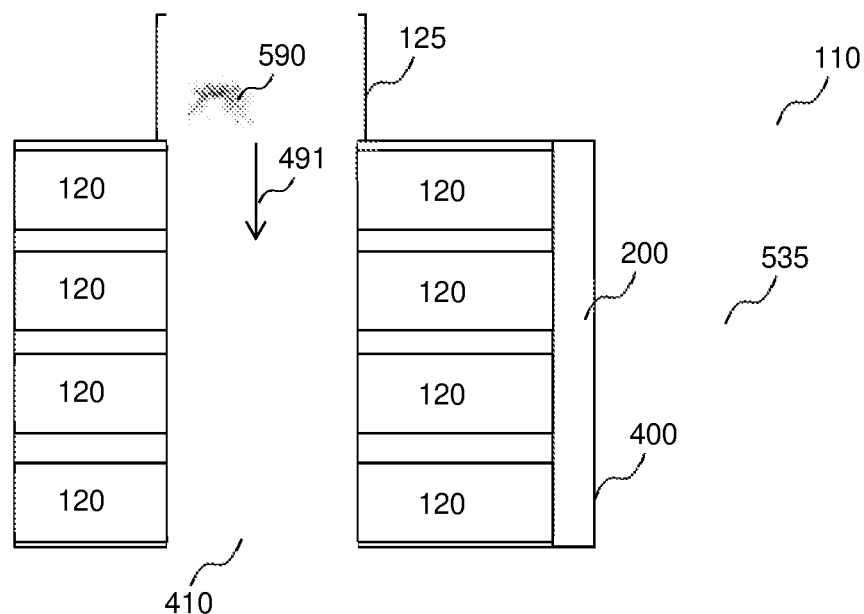
Figure 4.2

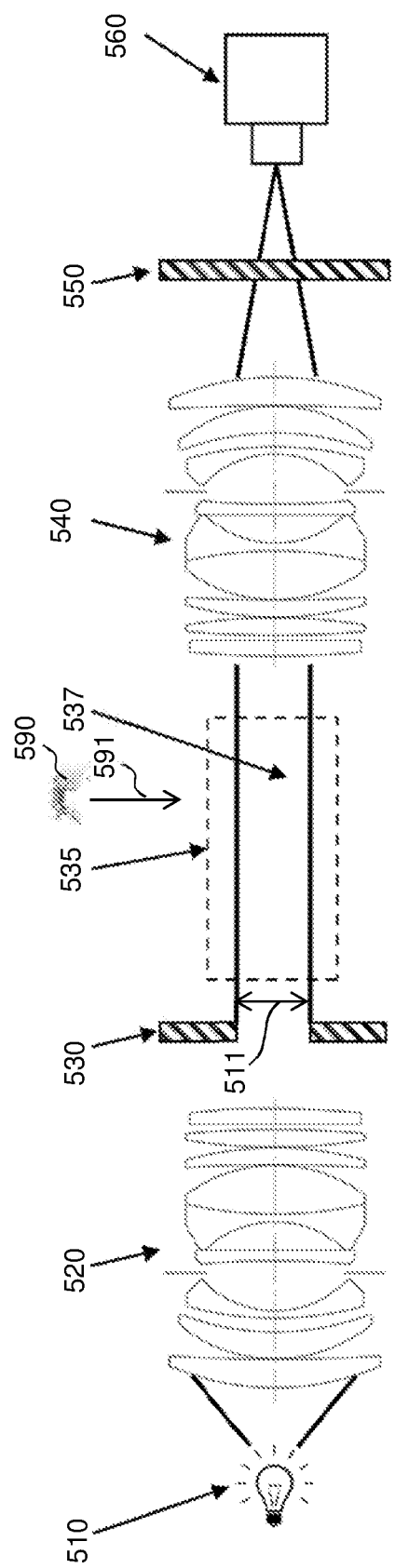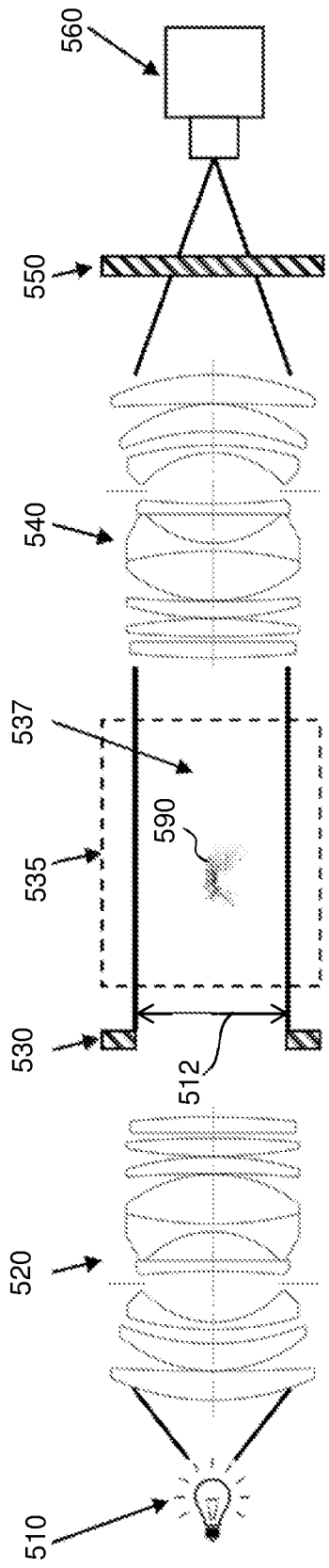
Figure 5.1
Figure 5.2

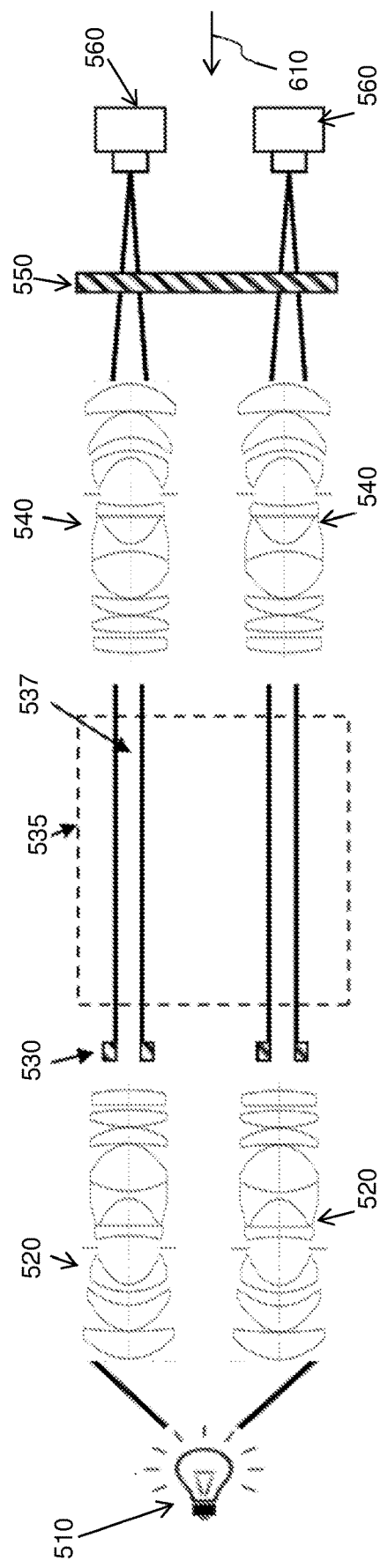
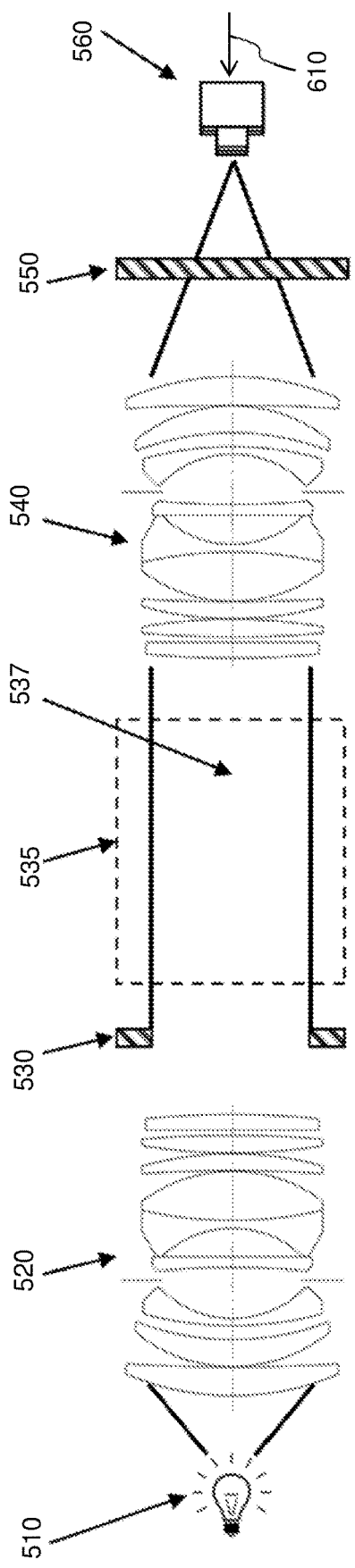
Figure 6.1
Figure 6.2

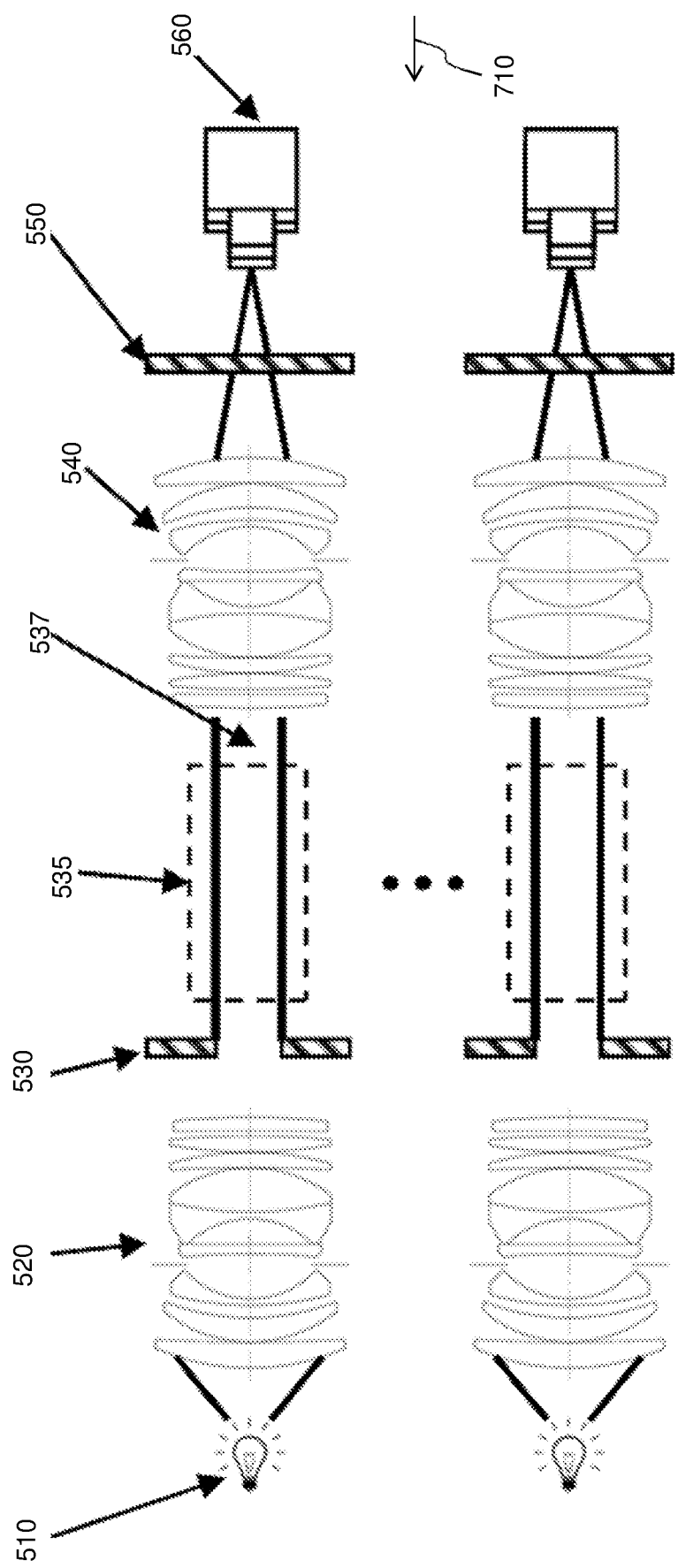
Figure 7.1

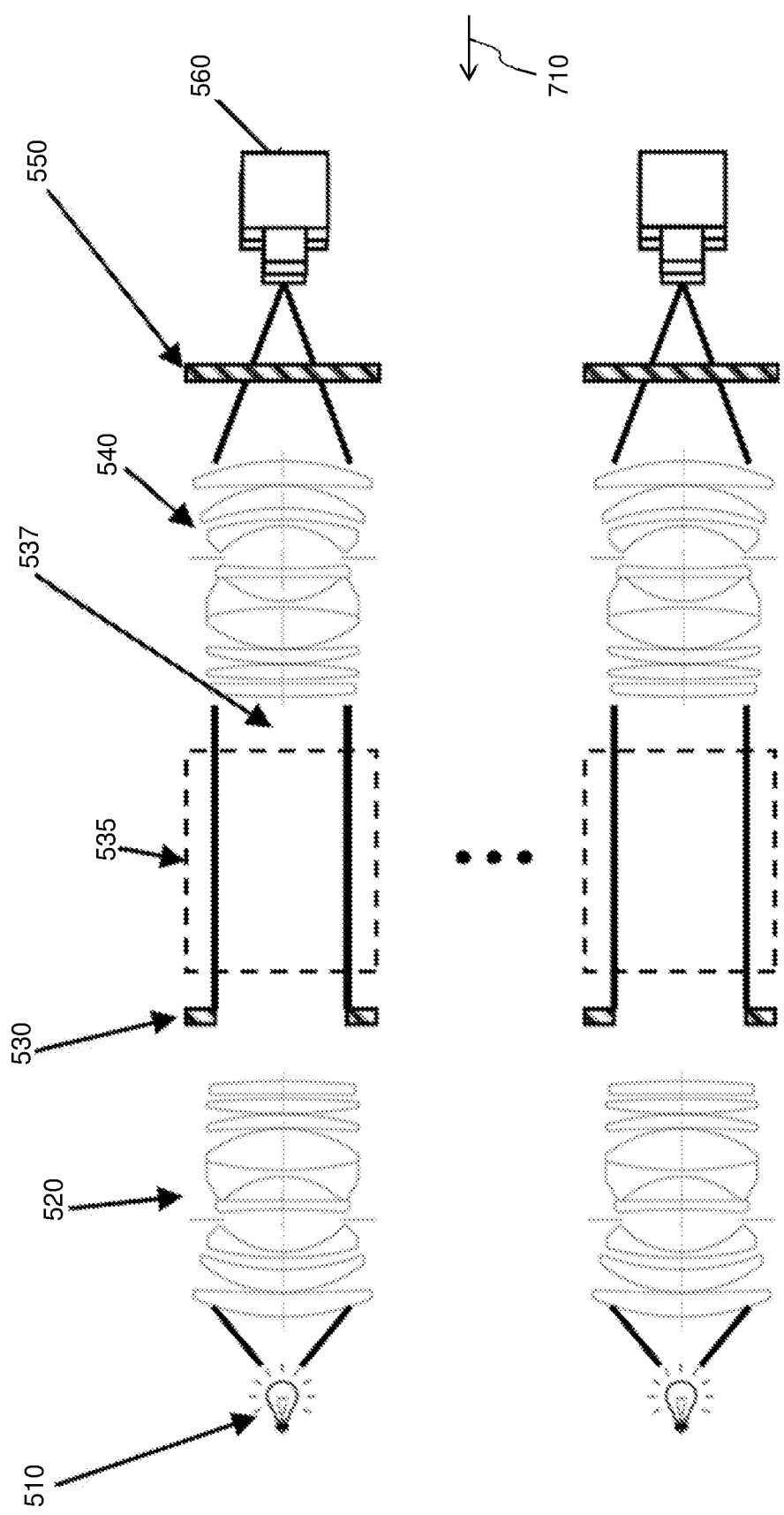
Figure 7.2

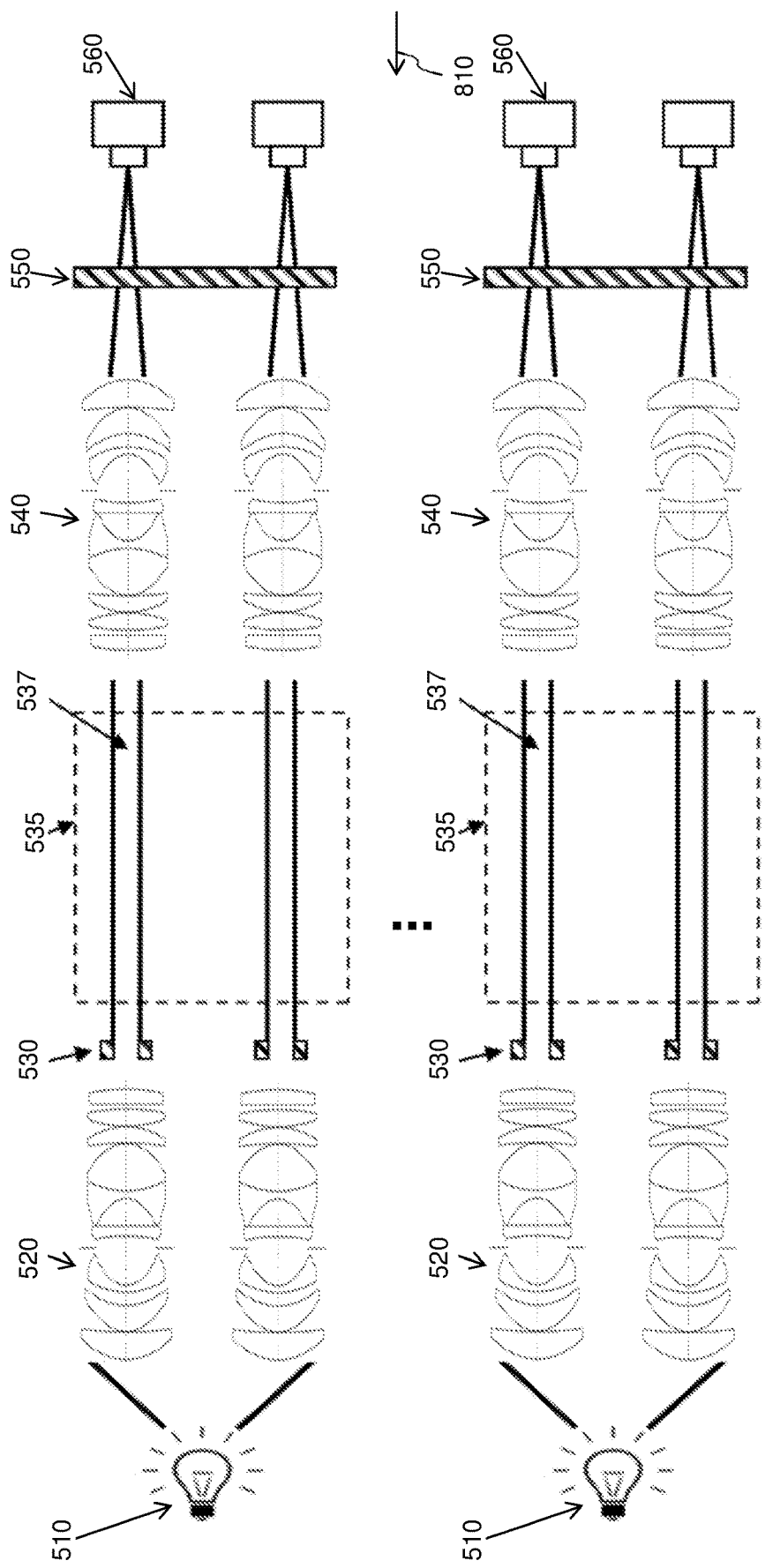
Figure 8.1

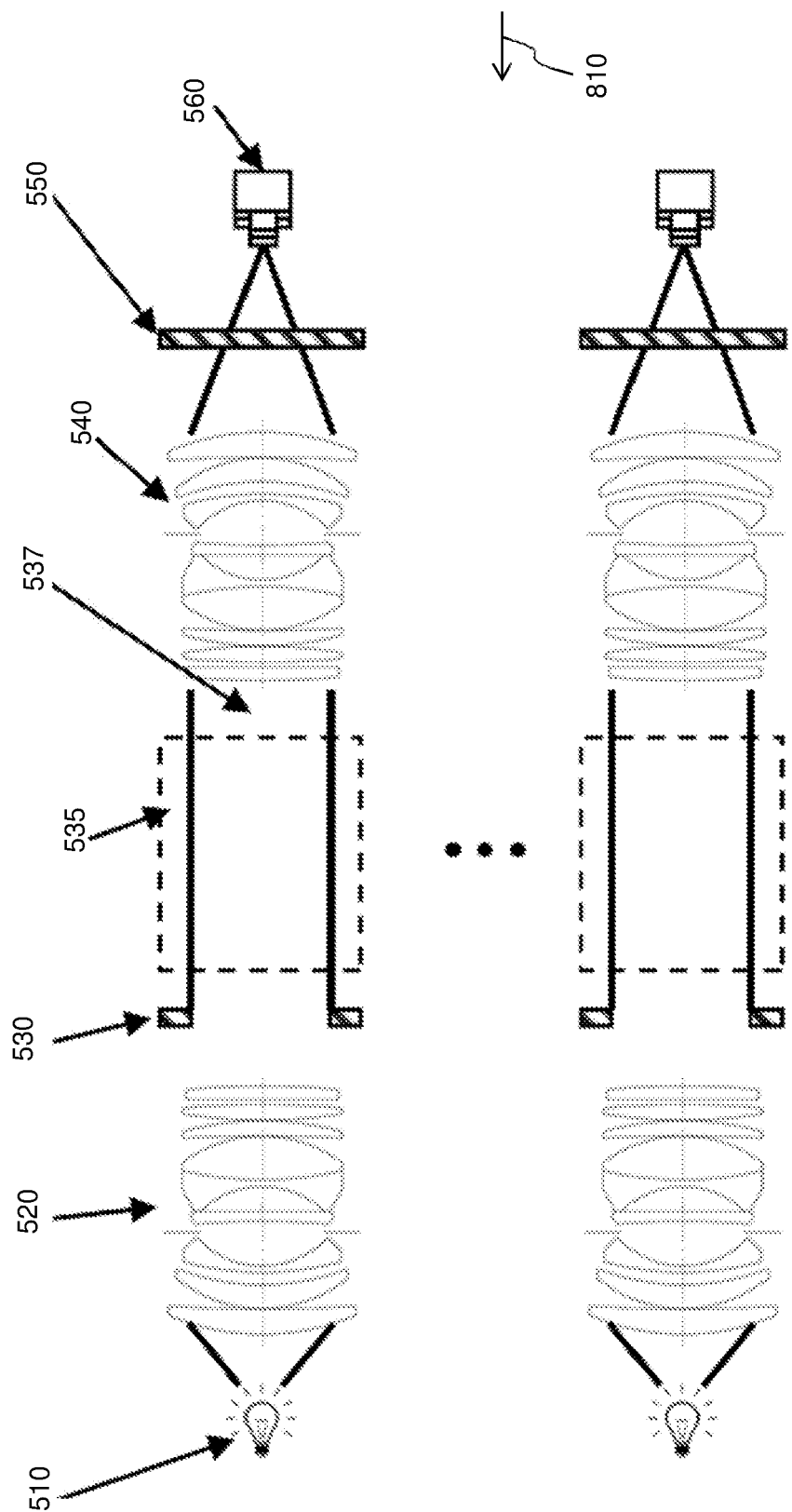
Figure 8.2

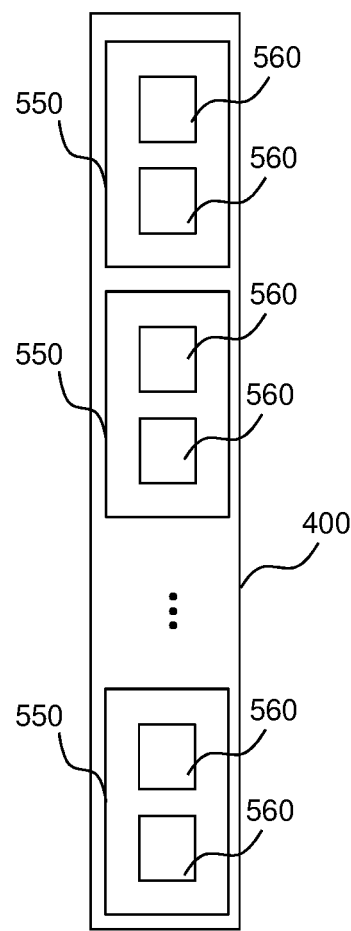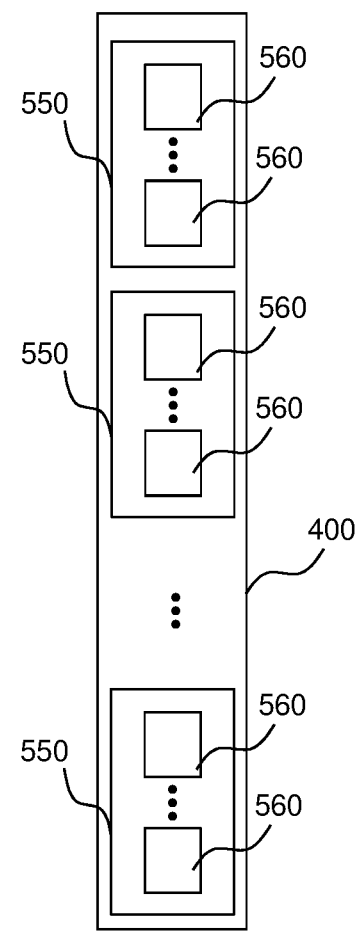
Figure 9A                    Figure 9B

100
SMART INSECT MONITORING AND IDENTIFICATION DEVICE

CROSS REFERENCE TO RELATED APPLICATIONS

This application is a national stage application, filed under 35 U.S.C. § 371, of International Application No. PCT/SG2019/050331, filed Jul. 3, 2019, which claims priority to SG 10201805751U, filed Jul. 3, 2018, each of which is incorporated herein by reference in its entirety.

FIELD OF THE INVENTION

This invention relates to a system and method of remotely detecting and identifying an insect. More particularly, this invention relates to a system and method of remotely detecting and identifying the types of insects from multiple locations.

PRIOR ART

It is important to accurately and in real-time monitor the complex transmission dynamics involving mosquitoes and humans. The scale of such an effort is challenging, due to the number of insects and species and geographical spread that needs to be monitored. Furthermore, there are more than 30 different disease-carrying mosquito species, each with varying geographical distributions, migration trends, and biting patterns. Being able to monitor and track mosquitoes or insects to get a statistically accurate picture of their interaction with humans is so far out of reach. Most of the monitoring systems rely heavily on human vision and assessment.

Therefore, those skilled in the art are striving to provide an improved system and method of detecting and identifying the types of insects.

SUMMARY OF THE INVENTION

The above and other problems are solved and an advance in the art is made by a system and method in accordance with this disclosure. A first advantage of a system and method in accordance with this disclosure the system and method continuously and remotely monitor mosquitoes over a wide geographical location. A second advantage of a system and method in accordance with this disclosure the spread of the mosquitoes can be determined over a time period. Hence, a demographic trend of the mosquitoes can be produced to allow users to monitor and evaluate the strategies to be deployed to control the population of the mosquitoes. Further advantages will be apparent from the description below.

A first aspect of the disclosure describes an insect detection device. The insect detection device comprises a sensing device having an optical source configured to emit an optical beam; a first lens group configured to collimate the optical beam to form a beam width of a first predetermined range and a beam height of a second predetermined range; a second lens group configured to collect the optical beam from the first lens group and arranged apart from the first lens group defining a sensing zone; an optical detector configured to receive the beam from the second lens group and translate the beam to electrical signals; and a processing unit configured to switch on the optical source and receive the electrical signals from the optical detector.

In accordance with an embodiment of the first aspect of the disclosure, the optical source is one of a laser, Light Emitting Diode (LED) and light emitter modulated with an external phase plate and operating at Visible Near Infra-Red (VIS-NIR) wavelengths.

In accordance with an embodiment of the first aspect of the disclosure, the light emission source is one of a laser, Light Emitting Diode (LED) and light emitter modulated with an external shutter and operating at Visible Near Infra-Red (VIS-NIR) wavelengths.

In accordance with an embodiment of the first aspect of the disclosure, the first predetermined range is between 10-120 mm.

In accordance with an embodiment of the first aspect of the disclosure, the second predetermined range is less than 50 mm.

In accordance with an embodiment of the first aspect of the disclosure, the second predetermined range is less than 10 times a size of a target insect.

In accordance with an embodiment of the first aspect of the disclosure, the second predetermined range is within 5 to 10 times a size of a target insect.

In accordance with an embodiment of the first aspect of the disclosure, the optical detector is a single pixel detector or an array of detectors.

In accordance with an embodiment of the first aspect of the disclosure, the insect detection device further comprises a number of the sensing devices and a housing to house the sensing devices, wherein the sensing devices are arranged in a 2 dimensional array.

In accordance with an embodiment of the first aspect of the disclosure, the first lens group comprises a pair of first lens groups arranged to form a pair of collimated beam, the second lens group comprises a pair of second lens groups and the optical detector comprises a pair of optical detectors arranged to receive the pair of collimated beam via the pair of second lens groups. In an embodiment of this embodiment, the insect detection device further comprises a number of the sensing devices and a housing to house the sensing devices.

In accordance with an embodiment of the first aspect of the disclosure, each of the sensing devices is arranged one on top of the other.

In accordance with an embodiment of the first aspect of the disclosure, the sensing devices are arranged in a 2 dimensional array.

In accordance with an embodiment of the first aspect of the disclosure, the housing houses the first lens group, the second lens group, and the optical detector. In accordance with an embodiment of the first aspect of the disclosure, the processing unit further comprises: a wireless transmission device; and a battery power source or an external power source.

In accordance with an embodiment of the first aspect of the disclosure, the insect detection device further comprises a central database and processing center to receive the electrical signals from the processing unit.

BRIEF DESCRIPTION OF THE DRAWINGS

The above and other features and advantages in accordance with this invention are described in the following detailed description and are shown in the following drawings:

FIG. 4.1 illustrating a perspective view of the sensing node in accordance with an embodiment of this disclosure;

FIG. 4.2 illustrating a cross sectional view of the sensing node in accordance with an embodiment of this disclosure;

FIG. 5.1 illustrating a front side view of a first embodiment of the sensing device in accordance with an embodiment of this disclosure;

FIG. 5.2 illustrating a top side view of the first embodiment of the sensing device in accordance with an embodiment of this disclosure;

FIG. 6.1 illustrating a front side view of a second embodiment of the sensing device in accordance with an embodiment of this disclosure;

FIG. 6.2 illustrating a top side view of the second embodiment of the sensing device in accordance with an embodiment of this disclosure;

FIG. 7.1 illustrating a front side view of a third embodiment of the sensing device in accordance with an embodiment of this disclosure;

FIG. 7.2 illustrating a top side view of the third embodiment of the sensing device in accordance with an embodiment of this disclosure;

FIG. 8.1 illustrating a front side view of a fourth embodiment of the sensing device in accordance with an embodiment of this disclosure;

FIG. 8.2 illustrating a top side view of the fourth embodiment of the sensing device in accordance with an embodiment of this disclosure;

FIG. 9A illustrating a right side view of the second embodiment of the sensing device in accordance with an embodiment of this disclosure;

FIG. 9B illustrating a right side view of an alternative of the second embodiment of the sensing device in accordance with an embodiment of this disclosure;

DETAILED DESCRIPTION

This invention relates to a system and method of remotely detecting and identifying an insect. More particularly, this invention relates to a system and method of remotely detecting and identifying the types of insects from multiple locations.

It is envisioned that an apparatus in accordance with embodiments of this disclosure aims to accurately and efficiently detect and identify a type of insect. In particularly, the system and method in accordance with embodiments of this disclosure allows identification on the types of insects based on certain signatures so that the demographic of the insects can be monitored. For purposes of this disclosure, the insect of interest is mosquito. However, one skilled in the art will recognise that the system and method may be modified so that other insects may be detected and identified without departing from the disclosure. Details of the system and method of detecting and identifying the distribution and types of insects will be described as follows.

Figure 1:
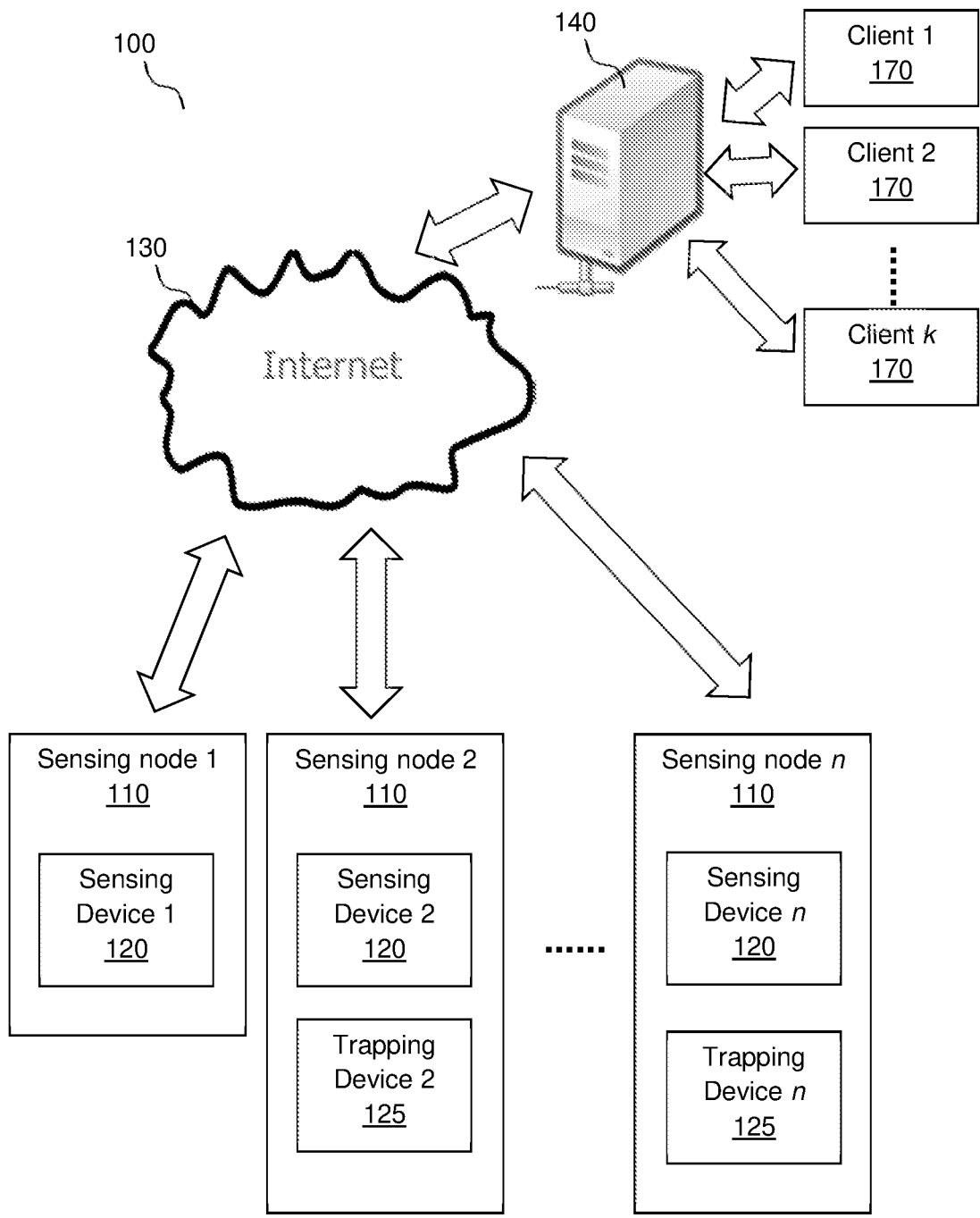
FIG. 1 illustrating an overview of the system for detecting and identifying insects from multiple locations in accordance with an embodiment of this disclosure.

FIG. 1 shows the overall system 100. The system 100 comprises a number of sensing nodes 110 and a main server 140. Each sensing node 110 includes a sensing device 120 and a processing unit to allow the sensing node 110 to be communicatively connected to the main server 140 via the internet 130. Each sensing node 110 may also include a trapping device 125.

Information obtained by the processing unit of each sensing node 110 is transmitted to the main server 140 for final processing. The analysis results performed by the main server can then be downloaded by various clients 170 via devices such as tablets or mobile phones for viewing.

Each sensing node is required to acquire signals from detector of the sensing device and deconstruct the signals to extract out the information such as the type of insect, size, sex and species. The deconstruction algorithm can be based on a Fourier transform, neural-network or wavelets where some form of pattern recognition algorithm can be applied to identify features in the signals. This algorithm can be implemented directly by the processing unit or transmitted to the main server to be centrally processed.

The main server 140 is a typical processing system such as desktop computer, laptop computer, or other computer terminal that is connected to internet 130 via either a wired or wireless connection to transmit information to and receive information from the processing unit of the sensing node 110. Main server 140 executes applications that perform the required processes in accordance with this disclosure. One skilled in the art will recognize that although only one main server 140 is shown, any number of servers may be connected and/or operating in parallel to perform the applications for providing embodiments of this disclosure without departing from this disclosure.

Processes are stored as instructions in a media that are executed by a processing system in main server 140 or a virtual machine running on the main server 140 to provide the method and/or system in accordance with this disclosure. The instructions may be stored as firmware, hardware, or software.

Figure 2:
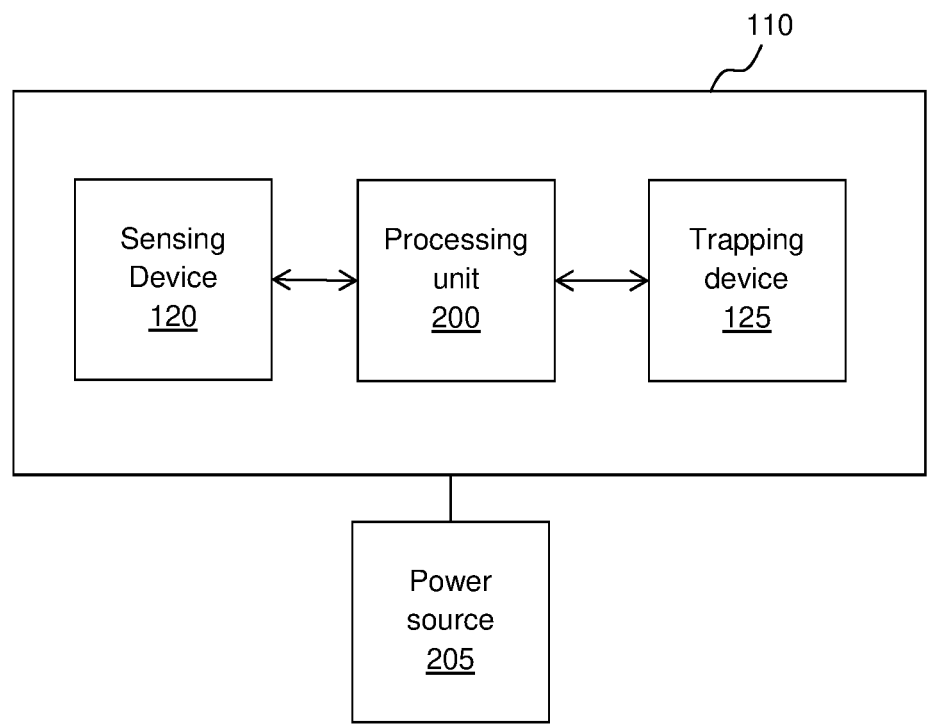
FIG. 2 illustrating a block diagram of sensing node in accordance with an embodiment of this disclosure.

FIG. 2 illustrates the components of the sensing node 110. The sensing node 110 comprises a sensing device 120, a processing unit 200, an optional trapping device 125, and a power source 205.

The sensing device 120 comprises an assembly of sensors installed in a manner that is triggered when an insect enters the sensing device 120. The sensing device 120 then captures the signature of signals generated by the flight of the insect and sends the information to the processing unit 200 which will in turn transmit the information to the main server 140. An application is provided on the processing unit of the main server 140 which includes an identification algorithm and a database of signatures unique to different species of insect such as mosquitoes. The signatures are also unique to the genders of each species of mosquitoes. The identification algorithm includes an artificial intelligence (AI) to identify the insect generating the signature of signals. Alternatively, the application including the identification algorithm and the database of signatures unique to different species of insect such as mosquitoes may be provided on the processing unit 200 of the sensing node 110.

Figure 3:
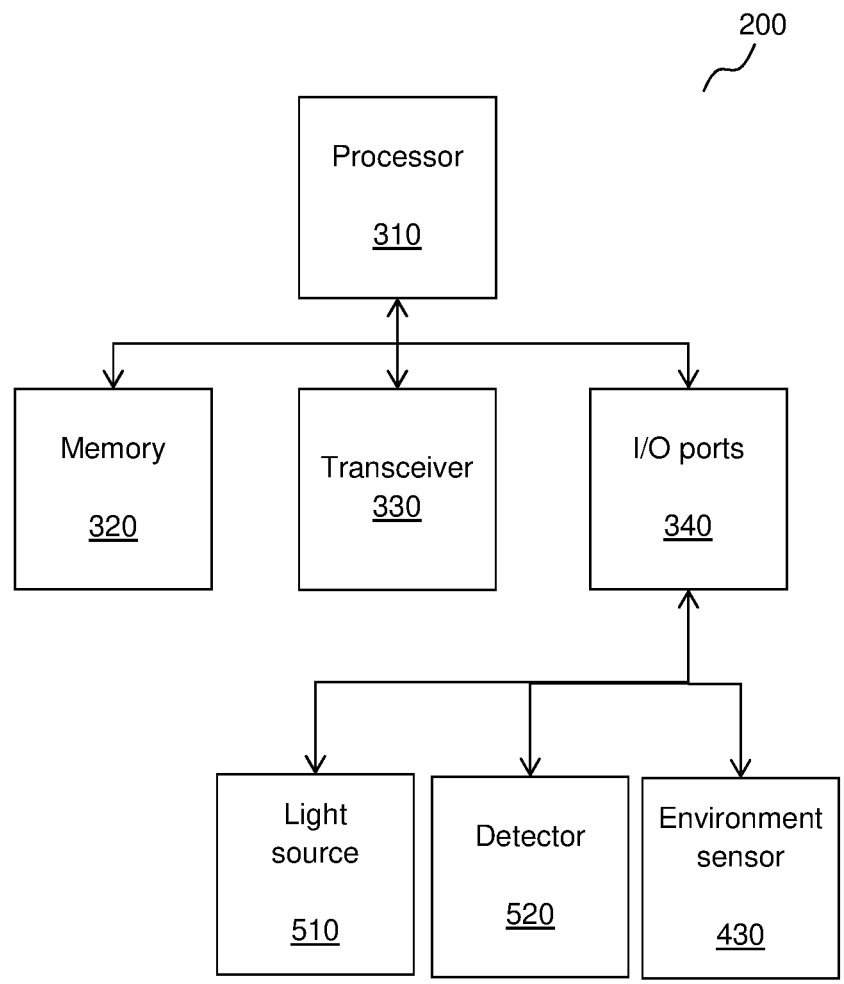
FIG. 3 illustrating a block diagram of circuitry provided to perform the processes in accordance with an embodiment of this disclosure.

FIG. 3 illustrates the block diagram of the processing unit 200. The processing unit 200 can receive and transmit data, execute software applications. The processing unit 200 comprises a processor 310, memory 320, transceiver 330, and input/output ports 340.

The processor 310 is a processor, microprocessor, microcontroller, application specific integrated circuit, digital signal processor (DSP), programmable logic circuit, or other data processing device that executes instructions to perform the processes in accordance with the present invention. The processor 310 has the capability to execute various applications that are stored in the memory 320.

The memory 320 may include read-only memory (ROM), random-access memory (RAM), electrically erasable programmable ROM (EEPROM), flash cards, or any memory commonly used for computers. The memory 320 stores instructions which are executable by the processor 310 to perform processes in accordance with the method and system of this disclosure. The memory 320 has sufficient capacity where data can be stored on the processing unit when it cannot be sent out to the main server 140 or as backup until a user is able to manually download the information.

Transceiver 330 connects processor 310 to a network for transmission of data to and from other processing systems such as main server 140. Transceiver 330 has long range wireless communication capability such as 3G/4G/5G telecommunication network protocols and/or short and/or medium range wireless capability such as Wireless Fidelity (Wi-Fi), Bluetooth, infrared, Zigbee, etc.

One or more input/output (I/O) ports 340 can be configured to allow the processor 310 to communicate with and control from various I/O devices. Peripheral devices that may be connected to processing unit 200 via the I/O ports 340 include the sensing device 120, a display, keypad, a USB storage device, an SD card or other storage device for transmitting information to or receiving information from the processing unit 200. In addition to updating applications stored on memory 320 or installing new applications onto the memory via the network device 330, a user may alternatively install new applications or update applications on the memory 320 through a user interface such as a USB via the I/O ports 340. Additional environment sensors 430 can be incorporated such as temperature and humidity sensors which data can be similarly stored or transmitted to the main server 140. Each of the individual devices such as sensing device 120, environment sensors 430 are identified and data time-logged.

The processing unit 200 is powered by the power source 205. Power source 205 may be battery operated or direct feed from the power grid. An external energy charging source can be incorporated such as a solar panel to extend the operational time of the sensing node 110. This is necessary for deployments in far locations where it is not possible to have routine inspections or maintenance and where it is not possible to draw power from the power grid.

One skilled in the art will recognize that other features may be included in the processing unit 200. Further, the components in processing unit 200 may be replaced by other components that perform similar functions. In brief, the processing unit 200 as shown in FIG. 3 is considered merely illustrative and non-limiting.

In order to reduce the cost of having to furnish each transceiver 330 with 3G/4G communication capability, the transceiver 330 may be equipped with short and/or medium range wireless capability and wirelessly connects to a sub-server. The sub-server would subsequently transmit the information to the main server 140. Essentially, the sub-server reduces the cost of having to furnish each processing unit 200 with 3G/4G communication capability. If future network communication protocol includes Internet of Things (IoT) communication at a more cost efficient rate, the processing unit 200 may be configured to transmit the information directly to the main server 140. In one embodiment, the transceiver 330 enables real-time upload of data to the main server 140 for further processing.

The sensing device 120 comprises an assembly of sensors to detect an insect entering the sensing node 110. The assembly of sensors capture a signature of signals generated by the flight of the insect. The signatures are collected by the processing unit 200. The assembly of sensors are arranged in a manner that is able to capture a signature that accurately count the number of mosquitoes, as well as determine the species and gender of the mosquito, when the mosquitoes enter the sensing node 110.

As it is not possible to predict when an insect flies through the sensing device 120, the sensing node 120 has to be in an "always-on" state. At the same time, the detection mechanism has to consume minimal power. Hence, the sensing device 120 uses an optical detector as it balances between low power, high accuracy and always operational. This involves one or more optical sources constantly emitting a beam to cover the desired area to monitor. At least one detector is located at the opposite end to pick up the optical signals. This detector can be a single pixel or array detector. As an insect flies through the optical beam, the signal is modulated by the insect and the modulated beam is picked up by the detector.

FIG. 4.1 shows a perspective view of a housing 400 of the sensing node 110 and FIG. 4.2 shows a cross sectional view along A-A of the housing 400. The sensing node 110 includes sensing devices 120 arranged within the housing 400 and a processing unit 200 at one side of the housing 400. The housing 400 has a through opening 410 that allows the insect 590 to fly through as shown by arrow 491. A trapping device 125 is coupled to one end of the through opening 410 for drawing insects to fly through the through opening 410. While FIG. 4.2 shows four sensing devices 120 arranged one on top of the other, it will be apparent from the description below that other arrangement of the sensing devices 120 may be implemented without departing from the disclosure.

The processing unit 200 is provided along a side wall on the right side of the housing for more efficient arrangement of the communication lines between the processing unit 200 and sensing devices 120. One skilled in the art will recognise that the arrangement as shown in FIG. 4.2 is only one possible arrangement of the processing unit 200. Other arrangements such as along the side wall on the left side of the housing 400, front wall of the housing 400 or rear wall of the housing 400 may be implemented without departing from the disclosure.

FIG. 5.1 shows a front side view of the sensing device 120 and FIG. 5.2 shows the top side view of the sensing device 120. The sensing device 120 comprises an optical source 510, a first lens group 520, iris 530, a second lens group 540, an optical filter 550 and an optical detector 560. The optical source 510 and optical detector 560 are arranged on opposite ends. The first lens group 520 and second lens group 540 are arranged between the optical source 510 and optical detector 560 and defining a sensing zone 535. The iris 530 is arranged between the first lens group 520 and the entrance of the sensing zone 535. The optical filter 550 is arranged between the second lens group 540 and the optical detector 560.

The optical source 510 may be a laser emitter, such as a laser diode, emitting laser beam; infrared emitter emitting infrared beam; or any light emitter such as Light Emitting Diode (LED). The optical source 510 is essentially a light emitter modulated with an external phase plate or an external shutter and operating at Visible Near Infra-Red (VIS-NIR) wavelengths.

The first lens group 520 is arranged after the optical source 510 to collimate the outgoing beam and to spread the coverage of the outgoing beam as large as possible while not compromising on the resultant output signal strength. A collimated beam is needed to pick up high frequency but low attenuation signals from the insects which would otherwise not be detected. The exact arrangement and configuration of the lens in the first lens group 520 are omitted for brevity as this is well known in the art. More importantly, the first lens group 520 has to receive and collimate the light from the optical source such that the first lens group 520 projects out an outgoing optical beam with a beam width 512 of a first predetermined range and a beam height 511 of a second predetermined range. Particularly, the beam width 512 is between 10-120 mm and the beam height 511 is less than 10 times the size of the insect to be detected in order to maximize the high frequency perturbations. Preferably, the beam height 511 is less than 50 mm for determining mosquitoes or within 5 to 10 times the size of the insect to be detected. It should also be noted that the first lens group 520 must be configured bearing in mind the type of the optical source 510 that will be used. This is because different types of optical source 510 may emit different characteristic of light source. Hence, a change in the choice of optical source 510 would likely require a reconfiguration of the first lens group 520 in order to achieve an outgoing optical beam with a beam width 512 of a first predetermined range and a beam height 511 of a second predetermined range. The first lens group 520 may include a prism or mirror to fold the optics, resulting in the more compact form factor.

The optical filter 550 is arranged after the first lens group 520 and serves to filter out external sources from the environment. The iris 530 serves to allow only the uniform optical beam from the first lens group 520 to pass through.

The second lens group 540 is arranged before the optical detector 560 to collect the emitted optical signal from the first lens group 520. This second lens group 540 may also include at least one prism or mirror to fold the optics, to reduce the size of the overall optics. In short, the second lens group 540 is arranged apart from the first lens group defining a sensing zone 535 and configured to collect the optical beam from the first lens group 520. All lenses in the first and second lens group 520 and 540 may be made using plastic through injection moulding or using glass or wafer-level optics. The collimated beam configuration would allow the modulation by the insect to have the consistent signal strength throughout the optical path. Without which, the intensity modulations would vary depending on where the insect passes through the optical path.

The optical beam can be modulated at the optical source or pass through a phase plate or a shutter to introduce known perturbations into the beam which is then deconstructed after detection.

The optical detector 560 is a device that converts the visible light into electrical signal. In order to maximize the efficiency of the optical detector 560, the optical detector 560 needs to be able to operate at about less than 10 KHz response time. The lower operating frequency of the optical detector 560 serves to attenuate high frequency signals from possible external influences like the environment. It is possible for a single optical detector 560 to cover 10 mm to 120 mm beam width, thus lowering power consumption and cost of implementation.

As shown in FIG. 5.1, an insect 590 will fly through the sensing zone 535 which is defined within the through opening 410, in the direction shown by arrow 591 thereby passing through optical beams 537. This allows the system to detect the insect flying through the sensing zone 535 and the type of insect based on the beam received by the optical detector 560. When the insect passes through the sensing zone 535, the beam is modulated by the insect which in turn is a beam signature that is unique to the insect. In short, the modulated beam is essentially a signature of the insect.

It should also be noted that the optical source 510, first lens group 520, second lens group 540, and optical detectors 560 will be enclosed along the length of the pathway of the optical beam 537 such that optical beam 537 will only be able to leave and enter through a restricted passage. This ensures that stray light is prevented from entering the optical source 510, first lens group 520, second lens group 540, and optical detectors 560. While FIGS. 5.1 and 5.2 do not show housings or enclosures covering the optical source 510, first lens group 520, second lens group 540, and optical detectors 560, one skilled in the art will recognise that the housings or enclosures are provided along the length of the pathway of the optical beam except the sensing zone 535.

FIGS. 6.1, 6.2, 7.1, 7.2, 8.1, and 8.2 illustrate different embodiments on the configuration and arrangement of the sensing device 120.

FIG. 6.1 shows a front side view of the sensing device 120 having a pair of first lens group 520, second lens group 540 and optical detectors 560 and FIG. 6.2 shows the top side view of the sensing device 120. In this configuration, the pair of first lens group 520, second lens group 540 and optical detectors 560 is arranged one on top of the other such that the pair of first lens group 520 produces two sets of optical beams 537 and the optical detectors 560 receives the two sets of optical beams 537 via the pair of second lens group 540. Further, while the pair of first lens group 520 is shown as separate pieces, one skilled in the art will recognise that the pair of first lens group 520 may be provided as a single piece first lens group 520 without departing from the disclosure. Similarly to the pair of first lens group 520, the pair of second lens group 540 may be provided as a single piece second lens group 540 without departing from the disclosure. The optical source 510, each of the first lens group 520, each of the second lens group 540, and each of the optical detectors 560 will be enclosed along the length of the pathway of the optical beam such that optical beam will only be able to leave and enter through a restricted passage. This ensures that stray light is prevented from entering the optical source 510, each of the first lens group 520, each of the second lens group 540, and each of the optical detectors 560. While FIGS. 6.1 and 6.2 do not show housings or enclosures covering the optical source 510, each of the first lens group 520, each of the second lens group 540, and each of the optical detectors 560, one skilled in the art will recognise that the housings or enclosures are provided along the length of the pathway of the optical beam except the sensing zone 535. Advantageously, in this configuration, one optical source 510, iris 530 and optical filter 550 is required, reducing the cost of materials. Furthermore, in this configuration, insects flying through will thereby pass through two sets of optical beams 537. This allows the system to identify the flight direction of the insects and also collect more information from two sets of beams for a single insect. For example, this allows a user to determine whether the insect is flying from the top to bottom of the through opening 410 or bottom to top of the through opening 410. FIG. 9A shows the configuration of the optical detector 560 and the optical filter 550 when viewed from the direction of the arrow 610. As shown in FIG. 9A, a number of sensing devices 120 are arranged one on top of the other within the housing 400 where each sensing device 120 comprises a pair of first lens group 520, second lens group 540 and optical detectors 560. An alternative arrangement is shown in FIG. 9B where more than 2 first lens group 520, second lens group 540 and optical detectors 560 may be provided in one sensing device 120.

Figure 10:
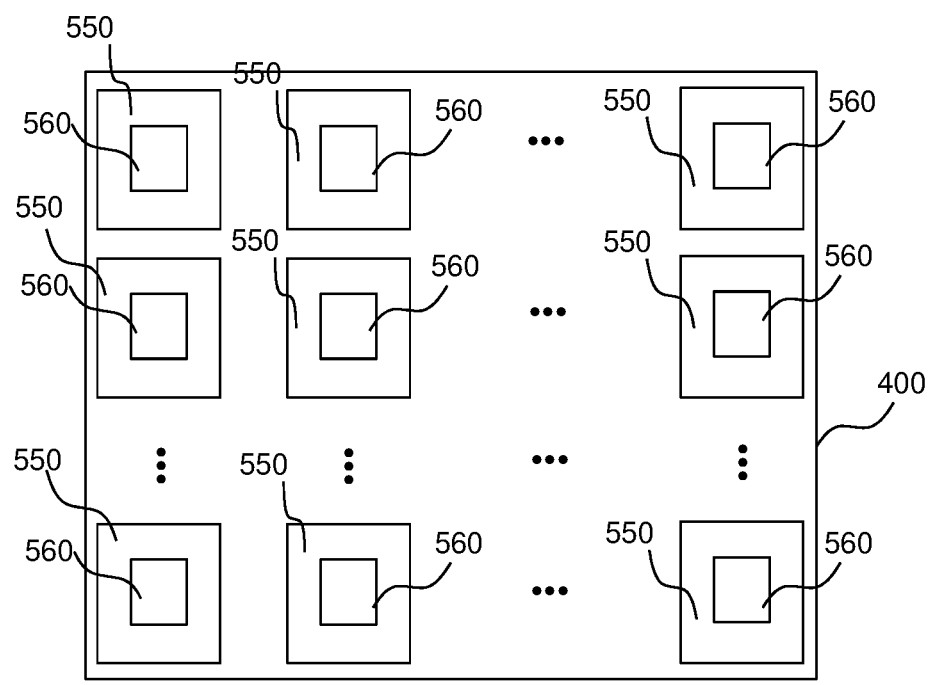
FIG. 10 illustrating a right side view of the third embodiment of the sensing device in accordance with an embodiment of this disclosure.

FIG. 7.1 shows a front side view of a number of sensing devices 120 cascaded in the vertical direction and FIG. 7.2 shows the top side view of a number of sensing devices 120 cascaded in the horizontal direction forming a two dimensional array. In this configuration, the insect flies through multiple optical beams and is applicable for situations where the flight paths of the insects need to be monitored. FIG. 10 shows the configuration of the optical detector 560 and the optical filter 550 when viewed from the direction of the arrow 710.

Figure 11A:
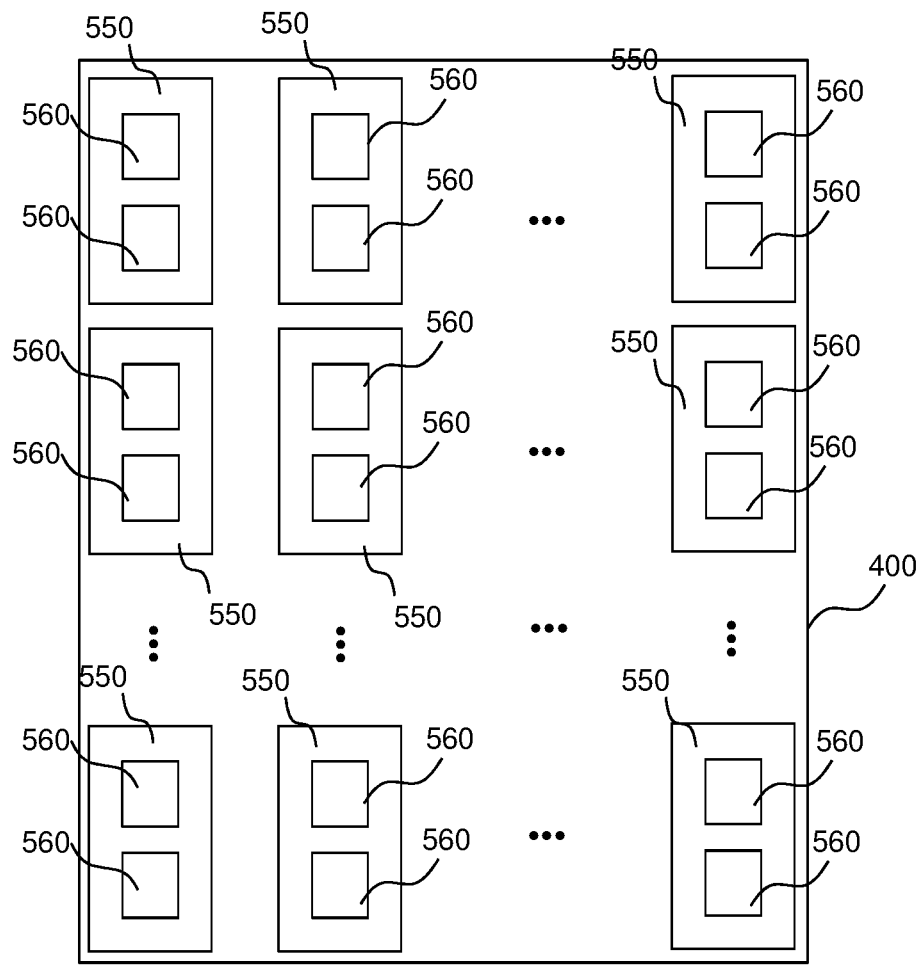
FIG. 11A illustrating a right side view of the fourth embodiment of the sensing device in accordance with an embodiment of this disclosure.
Figure 11B:
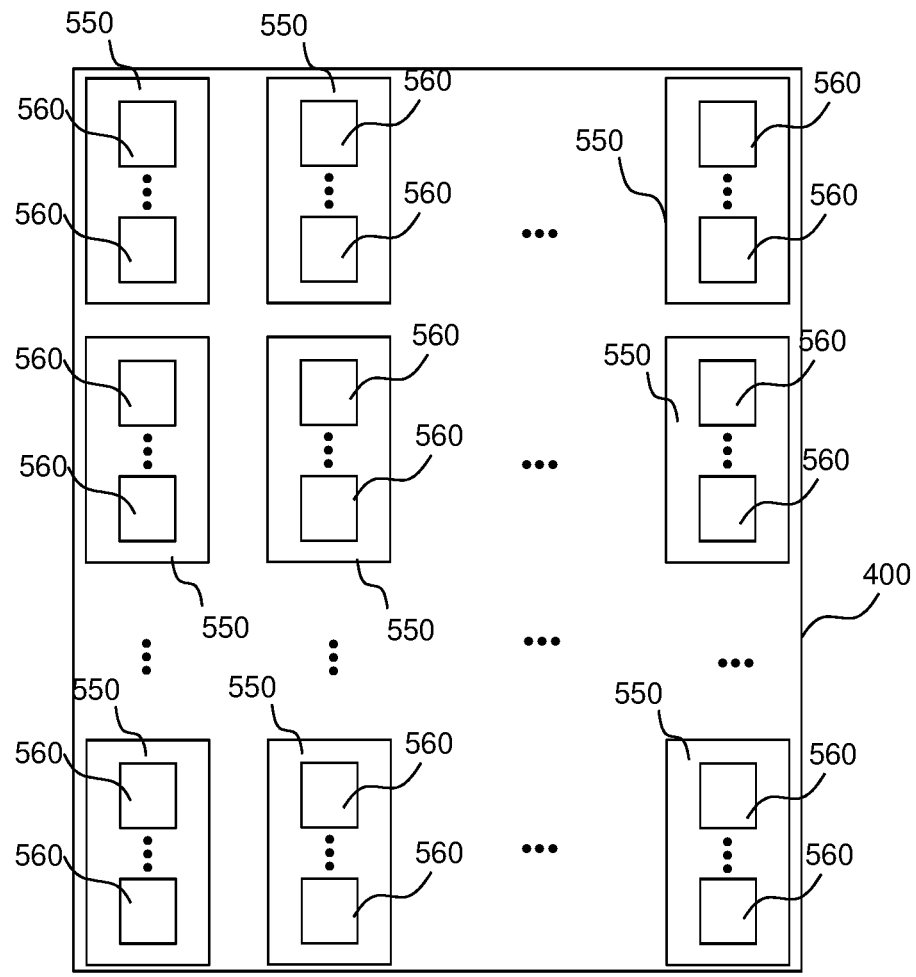
FIG. 11B illustrating a right side view of an alternative of the fourth embodiment of the sensing device in accordance with an embodiment of this disclosure.

FIG. 8.1 shows a front side view of a number of sensing devices 120, each sensing device in the same configuration as shown in FIG. 6.1 which is cascaded in the vertical direction and FIG. 8.2 shows the top side view of a number of sensing devices 120 cascaded in the horizontal direction forming a two dimensional array. In this configuration, the insects can be monitored over a larger area. A structural wall separating the individual optical beams may or may not be needed in this configuration. FIG. 11A shows the configuration of the optical detector 560 and the optical filter 550 when viewed from the direction of the arrow 810. An alternative arrangement is shown in FIG. 11B where more than 2 first lens group 520, second lens group 540 and optical detectors 560 may be provided in one sensing device 120.

Figure 12:
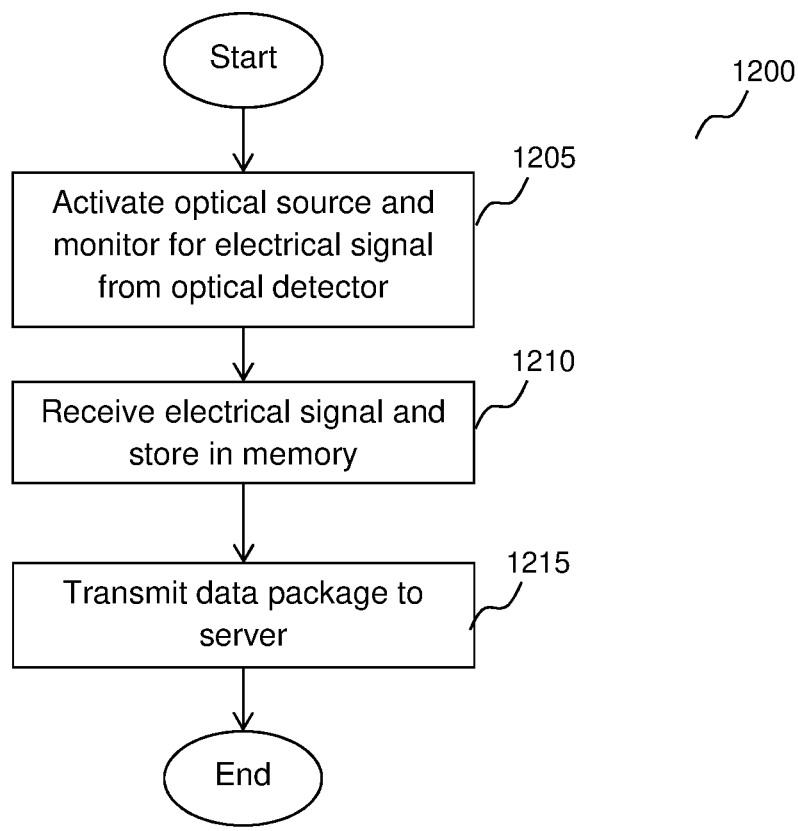
FIG. 12 illustrating a flow diagram of a process performed by the processor in processing unit for detecting and identifying an insect in accordance with an embodiment of this disclosure.

FIG. 12 illustrates a flow diagram of process 1200 performed by the processor in processing unit 200 in accordance with an embodiment of this disclosure. Process 1200 begins with step 1205 to activate the optical source 510 and monitor for electrical signal received from the optical detector 560. Upon receiving an electrical signal, the electrical signal is stored in the memory together with a time stamp in step 1210. After a predetermined time, all the electrical signals with time stamps are transmitted to the server in one or more data packages in step 1215. The data packages may be transmitted directly to the server via the internet or via a mobile memory storage. Process 1200 ends after step 1215.

The above is a description of exemplary embodiments of a system and method of detecting and identifying inserts remotely in accordance with this disclosure. It is foreseeable that those skilled in the art can and will design alternative systems based on this disclosure that infringe upon this invention as set forth in the following claims.

The invention claimed is:

1. An insect detection device comprising:
a sensing device comprising:
an optical source configured to emit an optical beam;
a first lens group configured to collimate the optical beam to form a beam width of between 10-120 mm and a beam height of within 5 to 10 times of a size of a target insect;
a second lens group configured to collect the optical beam from the first lens group and arranged apart from the first lens group defining a sensing zone; an optical detector configured to receive the beam from the second lens group and translate the beam to electrical signals; and
a processing unit configured to switch on the optical source and receive the electrical signals from the optical detector.

2. The insect detection device according to claim 1 wherein the optical source is one of a laser, Light Emitting Diode (LED) and light emitter modulated with an external phase plate and operating at Visible Near Infra-Red (VIS-NIR) wavelengths.

3. The insect detection device according to claim 1 wherein the optical source is one of a laser, Light Emitting Diode (LED) and light emitter modulated with an external shutter and operating at Visible Near Infra-Red (VIS-NIR) wavelengths.

4. The insect detection device according to claim 1 wherein the beam height is less than 50 mm.

5. The insect detection device according to claim 1 wherein the beam height is less than 10 times a size of a target insect.

6. The insect detection device according to claim 1 wherein the optical detector is a single pixel detector.

7. The insect detection device according to claim 1 further comprising a plurality of sensing devices and a housing to house the plurality of sensing devices, wherein the plurality of sensing devices are arranged in a 2 dimensional array.

8. The insect detection device according to claim 7, wherein the housing houses the first lens group, the second lens group, and the optical detector.

9. The insect detection device according to claim 1 wherein the first lens group comprises a pair of first lens groups arranged to form a pair of collimated beams, the second lens group comprises a pair of second lens groups and the optical detector comprises a pair of optical detectors arranged to receive the pair of collimated beams via the pair of second lens groups.

10. The insect detection device according to claim 9 further comprising a plurality of sensing devices and a housing to house the plurality of sensing devices.

11. The insect detection device according to claim 10 wherein each of the plurality of sensing devices is arranged one on top of the other.

12. The insect detection device according to claim 10 wherein the plurality of sensing devices are arranged in a 2 dimensional array.

13. The insect detection device according to claim 10 wherein the housing houses the first lens group, the second lens group, and the optical detector.

14. The insect detection device according to claim 1 wherein the processing unit further comprises:
a wireless transmission device; and
a battery power source or an external power source.

15. The insect detection device according to claim 1 further comprising a central database and processing center to receive the electrical signals from the processing unit.

* * * * *